United States Patent [19]
Remmers

[11] Patent Number: 5,755,414
[45] Date of Patent: May 26, 1998

[54] WHEELBARROW HANGER ASSEMBLY

[75] Inventor: Lee E. Remmers, Ocala, Fla.

[73] Assignee: Clairson, Inc., Newark, Del.

[21] Appl. No.: 656,976

[22] Filed: Jun. 6, 1996

[51] Int. Cl.$^6$ ........................................... A47F 5/08
[52] U.S. Cl. ............................. 248/201; 211/70.6
[58] Field of Search ........................ 248/201, 302, 248/316.5, 309.1; 211/106, 87.01, 18, 70.6, 94.02, 103

[56] References Cited

U.S. PATENT DOCUMENTS

| | | |
|---|---|---|
| 3,915,308 | 10/1975 | Ratzloff et al. |
| 4,143,845 | 3/1979 | Harris ........................... 248/302 X |
| 4,467,925 | 8/1984 | Ratzloff et al. |
| 4,809,941 | 3/1989 | Sheridan ........................ 248/302 X |
| 4,830,198 | 5/1989 | Csanady ......................... 248/302 X |
| 4,893,770 | 1/1990 | Bejak et al. .................... 248/302 X |
| 5,120,012 | 6/1992 | Rosenau ........................ 248/309.1 X |

FOREIGN PATENT DOCUMENTS

| | | | |
|---|---|---|---|
| 623036 | 7/1981 | Canada ........................... 248/201 |
| 73181 | 11/1931 | Sweden .......................... 248/309.1 |

Primary Examiner—Alvin C. Chin-Shue
Assistant Examiner—Long Dinh Phan
Attorney, Agent, or Firm—Polster, Lieder, Woodruff & Lucchesi, L.C.

[57] ABSTRACT

A hanger assembly for suspending a wheelbarrow along a wall and above a floor includes a hook mounted on the wall at a height from the floor at which it will engage a lip on the wheelbarrow bed without the lip's being lifted manually which it will support the wheelbarrow above the floor when the wheelbarrow is tilted around he hook as a fulcrum toward the wall. An upper hook is mounted on the wall above the lower hook. The upper hook is mounted for rotation away from the wheelbarrow lip to permit the lip to move between the upper hook and the wall and for rotation toward the lip to engage the lip to retain the wheelbarrow in its wall mounted position until the upper hook is rotated manually to release the lip.

4 Claims, 2 Drawing Sheets

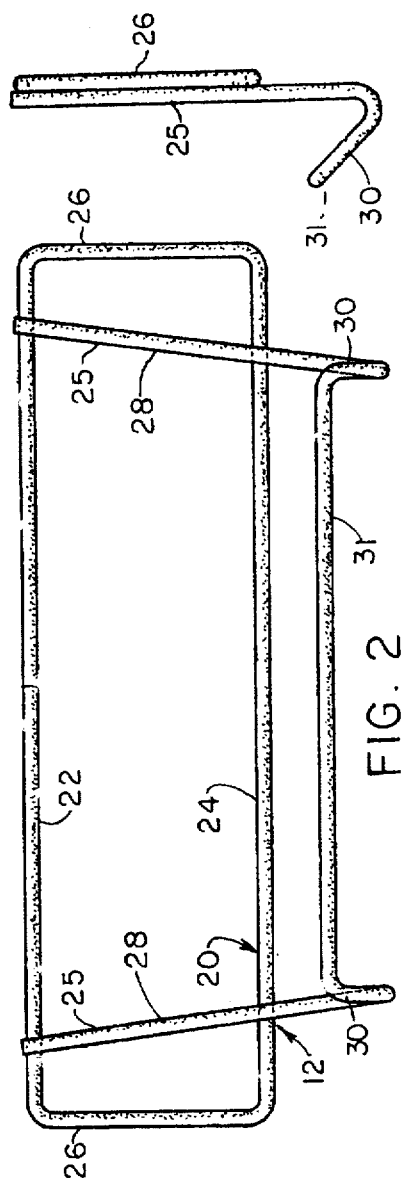
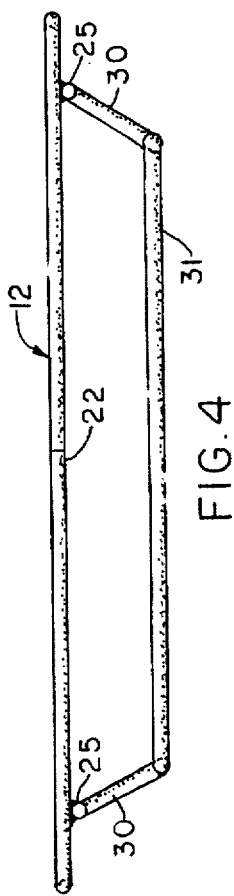
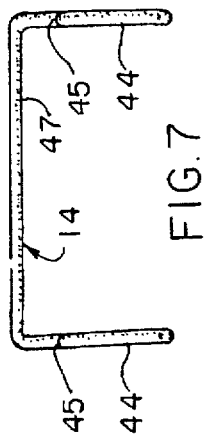
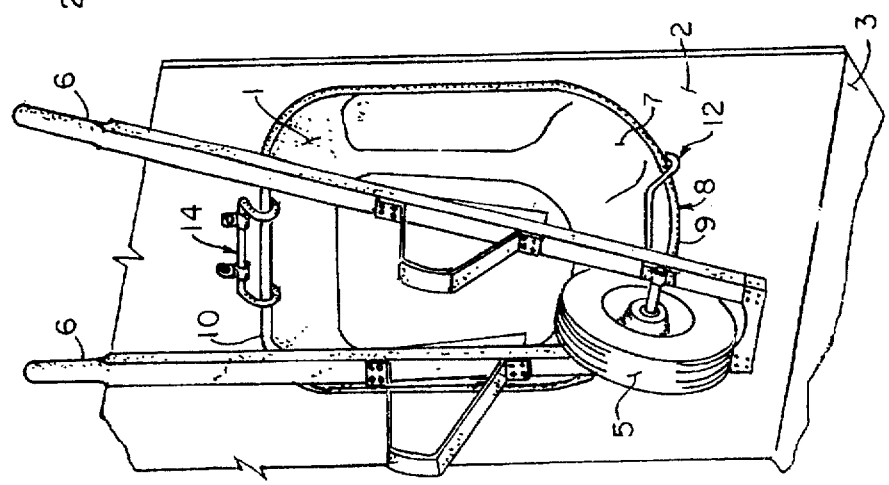

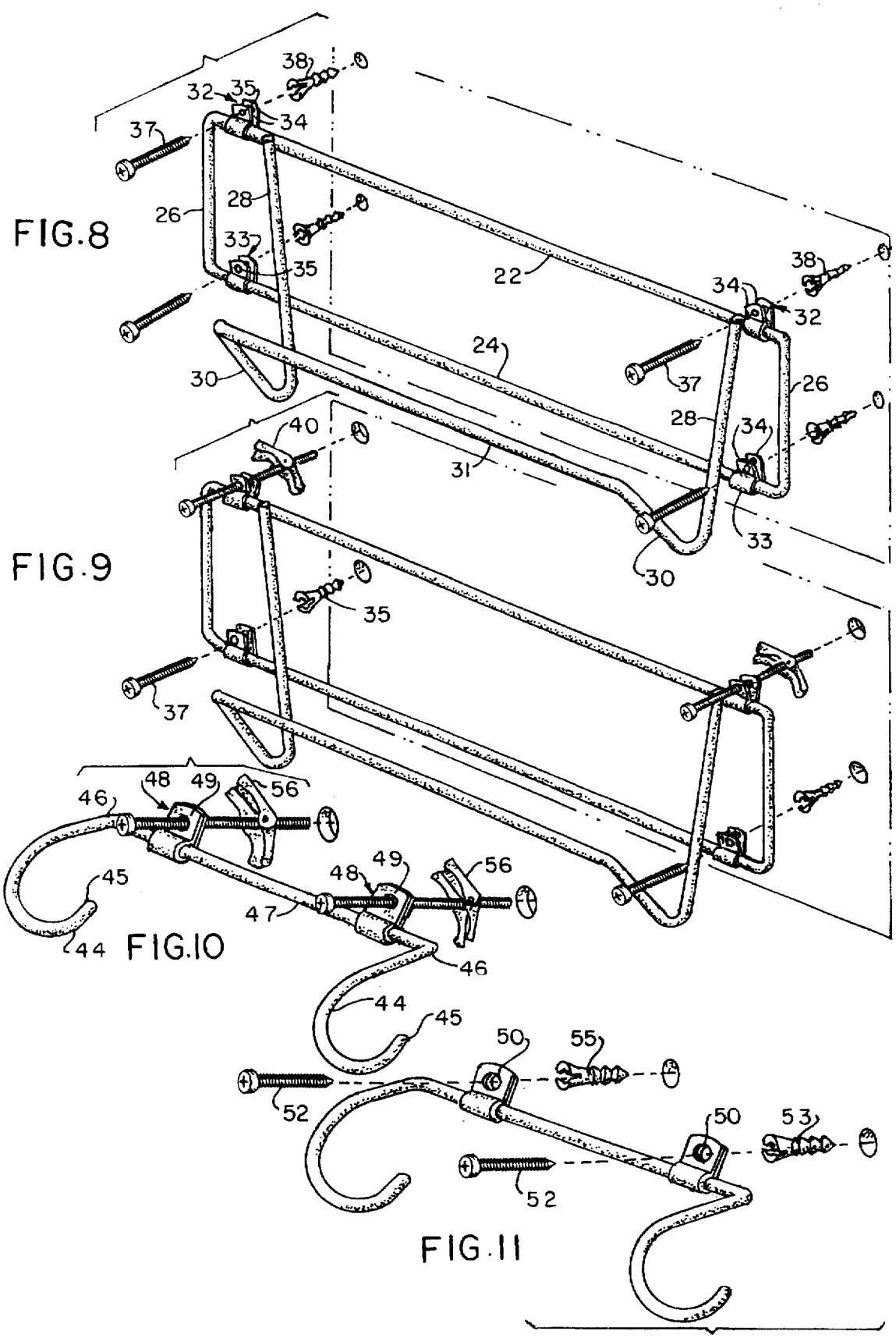

5,755,414

1

WHEELBARROW HANGER ASSEMBLY

BACKGROUND OF THE INVENTION

The problem of storing a wheelbarrow in an upright position along a wall has been addressed in the past. In particular, two patents to Ratzloff and Reimer, U.S. Pat. Nos. 3,915,308 ('308) and 4,467,925 ('925), have disclosed racks for hanging wheelbarrows. Both of those patents disclose a horizontal bar or channel, secured to a wall and provided with means for holding the handles of a wheelbarrow, and a vertical channel, supported by the horizontal channel, the vertical channel having at a lower end a trough-like member (U.S. Pat. No. '308) or a pair of arms projecting perpendicularly from the vertical channel, to receive an edge of a pan or bed of a wheelbarrow.

One of the objects of this invention is to provide a simple, inexpensive, effective wheelbarrow hanger, that is readily installed and installed in a way in which the wheelbarrow can be mounted clear of the floor, but without lifting the wheelbarrow manually, and held by a wheelbarrow bed lip-engaging device which can be manipulated with one hand.

Other objects will become apparent to those skilled in the art in the light of the following description and accompanying drawing.

SUMMARY OF THE INVENTION

In accordance with this invention, generally stated, a hanger assembly is provided for supporting a wheelbarrow along a wall and above a floor, the wheelbarrow having a bed or pan with a lip around it. The hanger assembly includes a lower hook mounted on the wall at a height from the floor at which it will engage the lip without the lip's being lifted manually but at which the lower hook will support the wheelbarrow above the floor when the wheelbarrow is tilted around the hook as a fulcrum toward the wall, and an upper hook mounted on the wall above the lower hook. The upper hook is mounted for rotation away from the wheelbarrow lip to permit the lip to move between the upper hook and the wall and for rotation toward the lip to engage the lip to retain the wheelbarrow in its wall-mounted position until the upper hook is rotated manually to release the lip.

In the preferred embodiment, the lower hook is made up of a rectangular frame, mounted on the wall with long edges of the frame parallel to the floor, and two spaced, legs, welded to upper and lower reaches of the frame, the legs having a long straight reach along which the leg is welded, and an upwardly, outwardly extending reach, at an outer end of which a generally horizontal, lip-engaging bar, integral with the legs, extends.

The upper hook preferably consists of a pair of C-shaped members joined at one end by a cross member, the C-shaped members having a free end directed toward the floor. The cross member is circular in cross section and is mounted for rotation between a position at which the C-shaped members clear the wheelbarrow lip and a position at which the outer ends of the C-shaped members engage the wheelbarrow lip.

In the method of mounting and using the hanger assembly of this invention, a wheelbarrow to be hung is wheeled into close proximity to the wall. A location is marked at which a front lip of the wheelbarrow will touch the wall. A hanger lower hook is then mounted directly on the wall at a level sufficiently below the location to permit the front lip to extend closely above the lower hook. The lip is then

2 extended over the lower hook and the wheelbarrow tilted around the hook as a fulcrum until the wheelbarrow is against the wall. A location is then marked at which the upper hook means can be moved manually selectively to engage and disengage a rear lip of the wheelbarrow, and the upper hook means is then mounted on the wall at the marked location.

In use, the wheelbarrow is wheeled to the position at which the lip of the bed of the wheelbarrow extends over the lower hook, the wheelbarrow is tilted around the lower hook until an upper lip of the bed of the wheelbarrow extends beneath the upper hook, the upper hook is swung down until the free ends of the C-shaped hook members engage the lip, and the wheelbarrow is mounted. It can be seen that this requires no lifting of the wheelbarrow beyond swinging it by the handles to the upright position, and only one manipulation of a single hook member. In most instances, if the upper hook is positioned properly, the movement of the upper lip of the wheelbarrow will displace the upper hook upwardly until the lip clears, when the hook members will fall into lip engaging position.

IN THE DRAWINGS

In the drawings, FIG. 1 is a view in perspective of a wheelbarrow mounted on the wheelbarrow hanger of this invention;

FIG. 2 is a view in front elevation of a lower hook member;

FIG. 3 is a view in side elevation of the lower hook member shown in FIG. 2;

FIG. 4 is a top plan view of the lower hook member shown in FIGS. 2 and 3;

FIG. 5 is a top plan view of the top hook; inverted;

FIG. 6 is a view in side elevation of the top hook shown in FIG. 5;

FIG. 7 is a view in front elevation of the top hook shown in FIGS. 5 and 6;

FIG. 8 is an exploded view in perspective of the hanger assembly lower hook and one embodiment of mounting means for the hook;

FIG. 9 is an exploded view in perspective of the lower hook shown in FIG. 8, with another set of mounting means;

FIG. 10 is a view in perspective of a top hook and one form of mounting means; and FIG. 11 is a view in perspective of the upper mounting hook with an alternative set of mounting means.

DESCRIPTION OF THE PREFERRED EMBODIMENT

Referring now to the drawing for one illustrative embodiment of hanger assembly of this invention, reference numeral 1 indicates a wheelbarrow mounted in accordance with this invention. The term "wheelbarrow" as used in the claims is intended to embrace two wheeled lawn carts and the like as well as the conventional single wheeled wheelbarrow illustrated. The wheelbarrow 1 is mounted on a wall 2 above a floor 3. The wheelbarrow 1 has a wheel 5 and handles 6, and a body or pan 7 with a lip 8 around its perimeter. The lip 8 has a front lip section 9 adjacent the wheel 5 and a rear lip section 10 between the handles 6.

The hanger assembly of this embodiment includes a lower hook assembly 12 and an upper hook assembly 14. The lower hook assembly includes a rectangular frame 20 with an upper reach 22, a lower reach 24 and side reaches 26.

Legs 25 have a relatively long straight reach 28 welded at an upper end to the upper reach 22 of the rectangular frame, and intermediate their lengths to the lower reach 24 of the rectangular frame, and an upwardly outwardly extending reach 30 the outer ends of which are joined by a cross bar 31, integral with the reaches 30.

Shown particularly in FIGS. 8 and 9, the lower hook is mounted on a wall by means of simple strap loops or clips 32 and 33, each with ears or tabs 34, through which aligned holes 35 extend to receive screws or bolts or pop rivets, whatever is indicated by the type of wall to which the lower hook is to be mounted. In FIG. 8, the fasteners are wood screws 37, taking into gray anchors 38. In FIG. 9, toggle bolts 40 are shown as being employed along the upper reach 22 of the rectangular frame, and wood screws or self-tapping screws 37, on the lower reach 24. However, these are simply illustrative; the form of fastener being no part of this invention.

Referring now to FIGS. 5, 6, 7, 10 and 11, the upper hook assembly in this embodiment consists of a pair of spaced hooks or claws 44, each with a free outer end 45 and an inner end 46, the inner ends 46 being joined by a cross bar 47, circular in cross section. The cross bar 47 is rotatably mounted in strap loops 48 with ears 49 through which fastener holes 50 extend, to permit the passage of various fasteners 52. In FIG. 10, the fasteners are shown as toggle bolts 56, for use with dry wall and the like; in FIG. 11, the fasteners are shown as wood or self-tapping screws, taking into gray anchors.

The method of installing the hanger assembly of this invention is as follows. A wheelbarrow is wheeled to the wall on which it is to be mounted, and the location at which the front lip of the wheelbarrow will touch the wall is marked. A horizontal line 1 ½ inches below the place marked on the wall is made, using a level. The clips or strap loops are then placed on the rectangular frame, the upper edge of the cross bar 31 of the lower hook is aligned with the line that has just been made, and the locations of screw holes are marked, using the holes in the tabs or ears of the clips. Using the appropriate hardware for the type of installation, the lower hook is then mounted on the wall. The wheelbarrow is then rolled to the point at which the front lip of the wheelbarrow extends over the cross bar of the lower hook, and the wheelbarrow is rotated about the lower hook until the top lip of the wheelbarrow is against the wall. The two clips by which the upper hook is mounted are then located with the upper hook in the position so that the free ends of the hooks or claws will engage the upper lip of the wheelbarrow, and the upper hook is then installed. Because the cross bar of the upper hook is circular in cross section, it will rotate within the "knuckles" of the clips 48.

Other variations in the construction of the hanger assembly of this invention within the scope of the appended claims will occur to those skilled in the art in the light of the foregoing disclosure. For example, the shape of the hooks or claws of the upper hook assembly can be varied so as to permit the hook to cam upwardly certainly when the wheelbarrow is swung around the lower hook and into position, and so that the claw will then drop down by the bias of gravity to engage the upper lip. A second cross bar, along the upper edge of the claws, forward of the cross bar 47 can be provided, to serve as a handle of sorts to facilitate raising the upper hook. An arm, extending perpendicularly from the wall, either itself flexible, or biased by a spring or by gravity, can have at its outer end a downwardly projecting hook or ledge, positioned and dimensioned to engage the rear lip of the wheelbarrow bed, or the hook or ledge itself can be resilient or resiliently biased to permit the wheelbarrow rear lip to pass under it and then to engage the lip. Alternatively, a hook, mounted on an arm extending from the wall, can rotate parallel to the plane of the wall to a position at which it first clears, then engages the wheelbarrow lip. These are merely illustrative.

I claim:

1. A hanger assembly for suspending a wheelbarrow along a wall and above a floor, said wheelbarrow having a bed with a lip having a lower lip section and an upper lip section, said assembly comprising lower hook means for mounting on said wall at a height from said floor at which said lower hook means will engage said lower lip section without the lip's being lifted manually but at which said lower hook means will support said wheelbarrow above said floor when said wheelbarrow is tilted around said lower hook means as a fulcrum toward said wall, and upper hook means for mounting on said wall above said lower hook means, said upper hook means having a cross bar mounted for movement away from said wheelbarrow upper lip section to permit said upper lip to move between said upper hook means and said wall, and for movement toward said upper lip to engage said upper lip to retain said wheelbarrow on the wall-mounted position until said upper hook means is moved manually to release said upper lip, said lower hook means comprising spaced legs mountable on said wall, said legs having a downwardly extending reach and at a lower end thereof an upwardly, outwardly extending reach and a generally horizontal lip-engaging bar between said upwardly outwardly extended reaches, said bar being of one piece with said legs, said downwardly extending reaches of said legs being secured to a rectangular frame and said frame having means for mounting an upper reach of said frame to said wall.

2. The hanger assembly of claim 1 wherein said legs are welded to upper and lower reaches of said rectangular frame.

3. The hanger assembly of claim 2 wherein said means for mounting comprise strap-loops having ears with fastener-receiving, aligned holes.

4. The hanger assembly of claim 3 wherein said lower reach is also provided with strap-loop mounting means having ears with fastener-receiving holes.

* * * * *